(No Model.) 2 Sheets—Sheet 2.
M. P. FARIS & H. A. FALLS.
MANURE DISTRIBUTER.
No. 375,807. Patented Jan. 3, 1888.
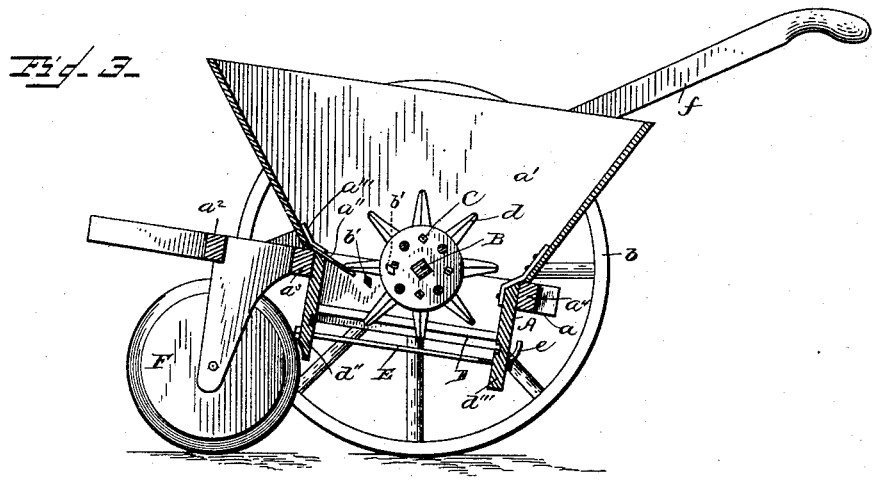
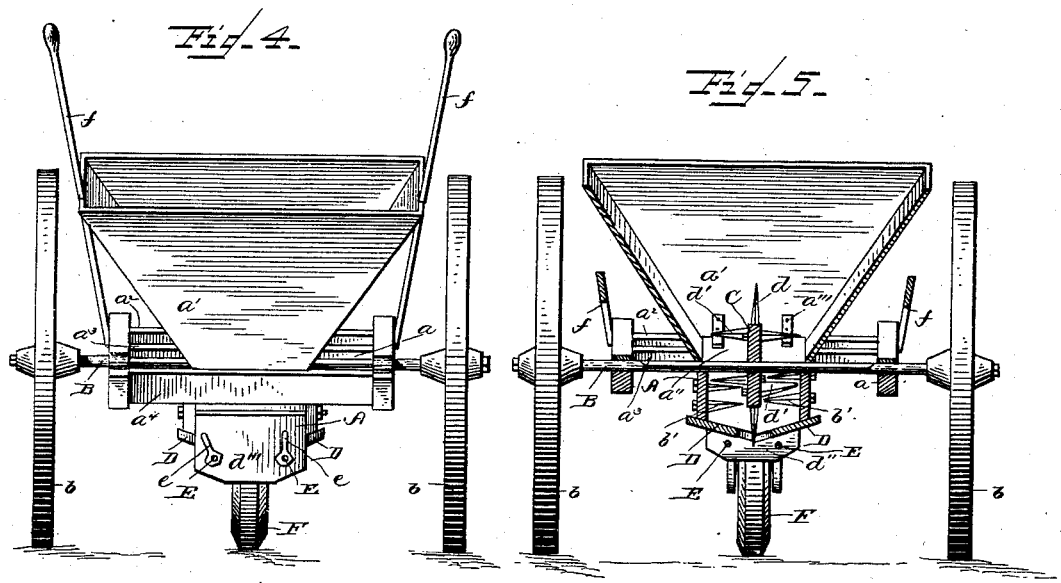
WITNESSES
Edwin L. Yewell.
Wm. J. Littell.
INVENTORS
M. P. Faris
H. A. Falls
By J. R. Littell, Attorney

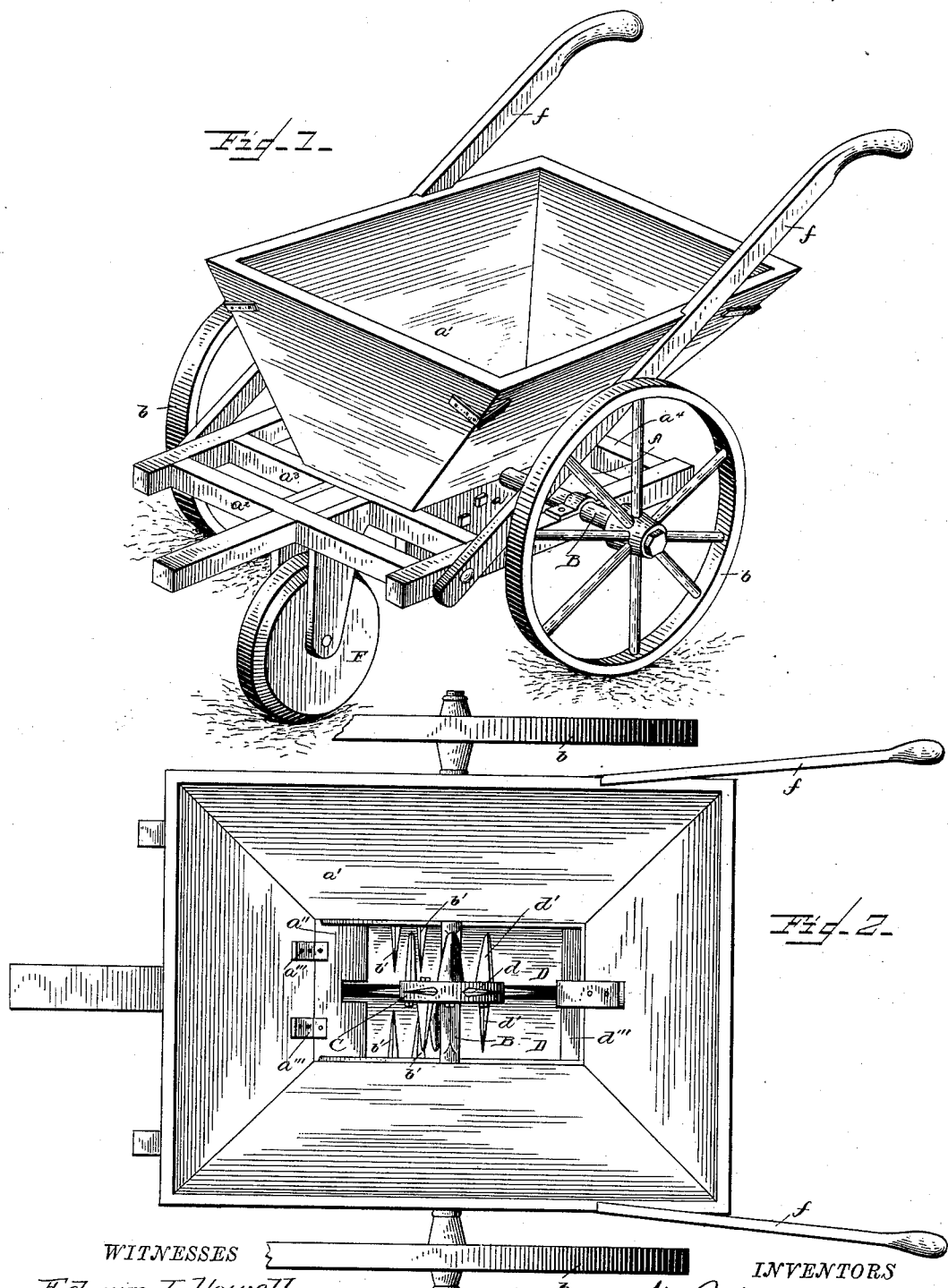

United States Patent Office.

MOSES P. FARIS AND HUGH A. FALLS, OF BETHANY, SOUTH CAROLINA.

MANURE-DISTRIBUTER.

SPECIFICATION forming part of Letters Patent No. 375,807, dated January 3, 1888.

Application filed October 4, 1887. Serial No. 251,471. (No model.)

*To all whom it may concern:*

Be it known that we, MOSES P. FARIS and HUGH A. FALLS, citizens of the United States of America, residing at Bethany, in the county of York and State of South Carolina, have invented certain new and useful Improvements in Fertilizer-Distributers; and we do hereby declare the following to be a full, clear, and exact description of the invention, which will enable others skilled in the art to which it appertains to make and use the same.

This invention pertains to certain new and useful improvements in fertilizer-distributers, having for its object the provision of simple and efficient means for agitating the fertilizer in the hopper and for regulating the supply thereof.

To this end the invention comprises the sundry details of construction, combination, and arrangement of parts, substantially as hereinafter fully set forth, and particularly pointed out in the claims.

In the accompanying drawings, Figure 1 is a view in perspective of our invention. Fig. 2 is a plan view thereof. Fig. 3 is a central longitudinal sectional view, and Fig. 4 is a rear end view. Fig. 5 is a transverse section.

Corresponding parts in the several figures are denoted by the same letters of reference.

Referring to the drawings, A represents an approximately oblong central box disposed at about the center of a square frame, $a$. This frame is composed of two longitudinal side bars connected by three parallel cross-bars, $a^2$ $a^3$ $a^4$. On this frame is mounted in any suitable manner a hopper, $a'$, the sides of which flare toward their upper ends, as shown, thus providing sufficient room for placing therein a suitable quantity or supply of fertilizer.

B is the central axle passed through ordinary keepers secured to the upper surfaces of the longitudinal side bars of the frame A, said axle being passed through corresponding apertures formed in the lower central portion of each side of the hopper $a'$ and the upper central portions of the sides of the box A. On the ends of this axle are rigidly secured two similar carrying-wheels, $b\,b$, said wheels being fast on said axles, so as to cause the same to revolve therewith in the movement of the machine. To the inner opposite sides of this central box, A, are rigidly secured four corresponding horizontally-disposed knives or projecting teeth, $b'\,b'$, said knives or teeth being preferably retained in position by passing their threaded ends through apertures in the sides of the box and placing nuts on said ends, as shown. An upper and lower knife or tooth is secured to each side, as shown, the upper one being slightly in rear of the lower forward one.

C is a central distributing-wheel rigidly secured to the axle B at the center thereof, the same being designed to revolve with said axle. To the outer circumference of this wheel C are rigidly secured at suitable distances apart knives or teeth $d$, the same being projected some distance from said wheel, as shown. To the sides of this distributing-wheel are also secured series of knives or teeth, $d'$, the ends of which are projected through apertures in said wheel, and rigidly secured by means of ordinary nuts screwed on the threaded ends thereof, as shown. The horizontally-disposed knives or teeth $b'$ are arranged, as above detailed, so as to permit of the passage therein between of the knives or teeth $d'$ of the distributing-wheel C when the latter revolves during the operation of the machine. To the lower end of the front inclined portion of the hopper $a$ is secured a projecting plate, $a''$, having a central aperture for passage of the knives or teeth $d$ of the wheel C, said plate being secured by means of suitable bent brackets, $a'''$, as shown.

D D are two correspondingly arranged inclined boards comprising the adjustable bottom of the central box, A, said boards being made to jointly have a V shape, the opposite sides thereof, however, not being allowed to meet by reason of the projection between the same of any one of the knives or teeth $d$ of the central wheel, C. These adjustable boards D D are designed to fit at their ends in corresponding inclined grooves formed in the inner opposite faces of the end pieces, $d''\,d'''$, of the central box, A.

E E are two similar rods projected through corresponding apertures formed near either side of the end pieces, $d''\,d'''$, the projecting threaded ends of said rods being provided with handled nuts $e\,e$, by means of which said rods can be tightened or loosened, as may be desired. The upper end of the end piece, $d'''$, is secured at its center by means of a bent plate to the rearward inclined board of the hopper a, so as to permit the same to be acted upon by the rods E.

To a centrally-disposed bar attached to the two front cross-bars, $a^2 a^3$, are secured the upper ends of two suitable corresponding supporting-arms or hanger-plates, carrying at their lower ends the axle of a front supporting-wheel, F.

To the sides of the side bars of the frame A and the upper ends of the sides of the hopper are secured two corresponding handles, f f, of ordinary construction, the purpose of which is obvious.

From what has been said it will be seen that by moving the inclined boards D D the desired distance apart, according to the amount of fertilizer it is desired to have carried through the central opening by the knives or teeth $d'$ of the wheel C, the same can be secured at that point by tightening the nuts on the threaded ends of the rods E, causing the end pieces, $d''$ $d'''$, to fit tightly against and hug said boards D.

It will thus be seen that our invention comprises simple and efficient means for regulating the amount of fertilizer to be distributed, and at the same time provides efficient means for agitating and thoroughly separating the fertilizer prior to the distribution thereof.

We claim as our invention—

1. The adjustable bottom, comprising the inclined boards, the grooved end pieces, and the nutted rods for retaining said boards in position, substantially as shown and described.

2. The combination, with the hopper, the carrying-wheels, and their axle, of the central box having the grooved end pieces, the inclined boards, and the threaded rods connecting said end pieces and having handled nuts screwed thereon, substantially as shown, and for the purpose stated.

3. In a fertilizer-distributer of the class herein described, the combination, with the hopper, the carrying-wheels, and their axle, of the central distributing-wheel having series of knives or teeth, the opposite upper and lower knives or teeth, the adjustable inclined boards, the grooved end pieces, and the threaded rods connecting said end pieces, substantially as shown and described.

In testimony whereof we affix our signatures in presence of two witnesses.

MOSES P. FARIS.
HUGH A. FALLS.

Witnesses:
  J. L. McGILL,
  M. B. HENRY.